US012694002B2

(12) United States Patent
Mana et al.

(10) Patent No.: US 12,694,002 B2
(45) Date of Patent: *Jul. 28, 2026

(54) METHOD AND SYSTEM FOR MIGRATING DATABASE CONTENT ONTO NEW DATABASE INFRASTRUCTURE

(71) Applicant: JPMorgan Chase Bank, N.A., New York, NY (US)

(72) Inventors: Chandrasekharan N Mana, Hoffman Estates, IL (US); Venkattilak Singireddy, Frisco, TX (US); Murugan Muthuswamy, Bengaluru (IN); Vishnu Vardhan Reddy Thokala, Warangal (IN); Ramarao Jangam, Plano, TX (US); Hemalatha Ramachandran, Frisco, TX (US); Ananth Hegde, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,458

(22) Filed: Feb. 13, 2025

(65) Prior Publication Data

US 2025/0217331 A1 Jul. 3, 2025

Related U.S. Application Data

(63) Continuation of application No. 18/440,269, filed on Feb. 13, 2024, now Pat. No. 12,259,858.

(30) Foreign Application Priority Data

Dec. 28, 2023 (IN) .............................. 202311089523

(51) Int. Cl.
*G06F 16/00* (2019.01)
*G06F 16/21* (2019.01)

(52) U.S. Cl.
CPC .................................. *G06F 16/214* (2019.01)

(58) Field of Classification Search
CPC .............................. G06F 16/214; G06F 16/21
See application file for complete search history.

(56) References Cited

U.S. PATENT DOCUMENTS

| | | | | |
|---|---|---|---|---|
| 7,500,072 | B2 * | 3/2009 | Arndt | G06F 13/28 |
| | | | | 711/165 |
| 10,339,067 | B2 * | 7/2019 | Eckert | G06F 12/1036 |
| 12,259,858 | B1 * | 3/2025 | Mana | G06F 16/214 |
| 2022/0036272 | A1 * | 2/2022 | Karimi | G06N 5/027 |

* cited by examiner

*Primary Examiner* — Cheryl Lewis
(74) *Attorney, Agent, or Firm* — Greenblum & Bernstein, P.L.C.

(57) ABSTRACT

A system configured to: determine an optimal migration cache size; interface with a source database; index each respective entry from among the plurality of database record entries based on their respective database record entry dates; respectively prioritize each entry from among the plurality of database record entries for migration based on their plurality of respective database record entry dates and sizes; queue a queue of unmigrated database record entries for migration based on each respective prioritization; and initiate a migration of each respective entry from among the queue of unmigrated database record entries.

20 Claims, 5 Drawing Sheets

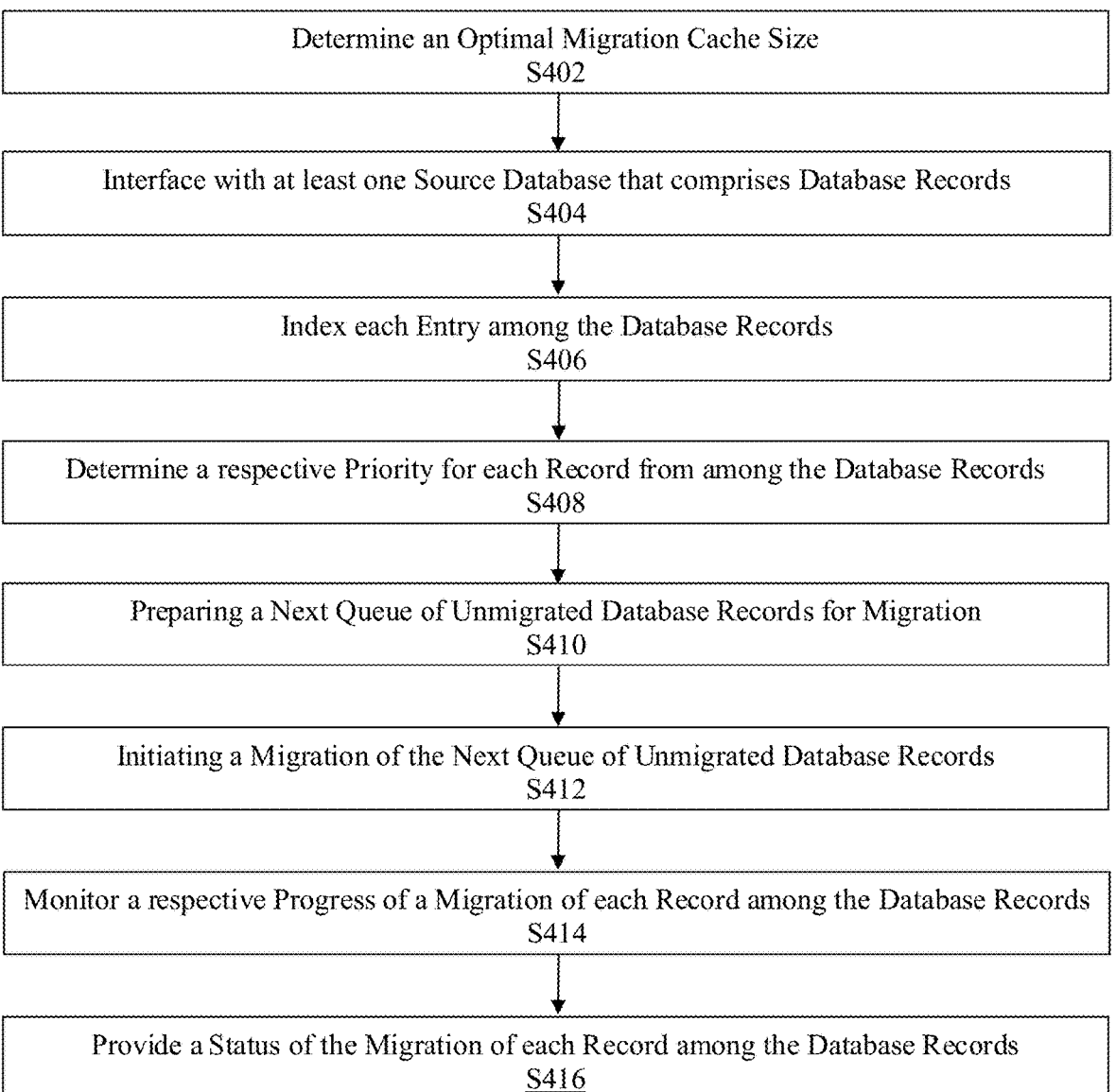

400

Determine an Optimal Migration Cache Size
S402

Interface with at least one Source Database that comprises Database Records
S404

Index each Entry among the Database Records
S406

Determine a respective Priority for each Record from among the Database Records
S408

Preparing a Next Queue of Unmigrated Database Records for Migration
S410

Initiating a Migration of the Next Queue of Unmigrated Database Records
S412

Monitor a respective Progress of a Migration of each Record among the Database Records
S414

Provide a Status of the Migration of each Record among the Database Records
S416

FIG. 4

Migration Chunks Tracker – Migration of chunks InProgress

500

| MIG_CHUNK_ID | MIG_CONFIG_ID | MIG_CHUNK_STATUS | MIG_CHUNK_START_DT | MIG_CHUNK_END_DT | MIG_CHUNK_ERROR_MSG | MIG_PROCESSING_START_DT | MIG_PROCESSING_END_DT |
|---|---|---|---|---|---|---|---|
| 1 | 2743 | 100 S3_RESTORES_INITIATED | 07-DEC-20 12.06.60.000000000 | 07-NOV-21 10.11.57.000000000 AM | (null) | 08-AUG-23 12.26.62.000000000 AM | 08-AUG-23 12.31.44.000000000 AM |
| 2 | 2753 | 101 COMPLETED | 13-JAN-23 01.07.09.000000000 | 15-JAN-23 11.46.57.000000000 AM | (null) | 08-AUG-23 12.27.17.000000000 AM | 08-AUG-23 12.31.21.000000000 AM |
| 3 | 2752 | 101 COMPLETED | 08-DEC-22 03.35.62.000000000 | 13-JAN-23 01.07.06.000000000 AM | (null) | 08-AUG-23 12.27.11.000000000 AM | 08-AUG-23 12.31.21.000000000 AM |
| 4 | 2751 | 101 COMPLETED | 16-OCT-22 07.11.57.000000000 | 08-DEC-22 03.35.01.000000000 AM | (null) | 08-AUG-23 12.27.02.000000000 AM | 08-AUG-23 12.31.21.000000000 AM |
| 5 | 2750 | 101 COMPLETED | 05-JUN-22 02.32.59.000000000 | 07-NOV-22 10.54.58.000000000 AM | (null) | 08-AUG-23 12.26.57.000000000 AM | 08-AUG-23 12.35.56.000000000 AM |
| 6 | 2749 | 101 COMPLETED | 17-OCT-21 10.10.36.000000000 | 31-JUL-22 09.06.11.000000000 AM | (null) | 08-AUG-23 12.26.57.000000000 AM | 08-AUG-23 12.31.20.000000000 AM |
| 7 | 2748 | 101 MANUAL_MFA_REQUIRED | 30-JUN-20 07.02.19.000000000 | 17-OCT-21 10.10.35.000000000 AM | (null) | 08-AUG-23 12.25.01.000000000 AM | (null) |
| 8 | 2754 | 101 MANUAL_MFA_REQUIRED | 15-JAN-23 11.42.58.000000000 | 05-JUN-23 02.52.56.000000000 AM | (null) | 08-AUG-23 12.25.20.000000000 AM | (null) |
| 9 | 2755 | 101 S3_RESTORES_INITIATED | 31-JAN-22 09.56.12.000000000 | 16-OCT-22 07.11.46.000000000 AM | (null) | 08-AUG-23 12.27.02.000000000 AM | 08-AUG-23 12.31.49.000000000 AM |
| 10 | 2789 | 103 NEW | 23-MAY-22 03.56.53.000000000 | 23-MAY-22 11.02.44.000000000 AM | (null) | 08-AUG-23 12.29.02.000000000 AM | (null) |
| 11 | 2799 | 103 NEW | 23-MAY-22 11.02.63.000000000 | 02-NOV-22 03.13.52.000000000 AM | (null) | 08-AUG-23 12.29.02.000000000 AM | (null) |
| 12 | 2739 | 103 NEW | 02-NOV-22 03.13.53.000000000 | 02-NOV-22 11.16.46.000000000 AM | (null) | 08-AUG-23 12.28.33.000000000 AM | (null) |
| 13 | 2800 | 103 NEW | 02-NOV-22 11.16.41.000000000 | 22-DEC-22 02.37.16.000000000 AM | (null) | 08-AUG-23 12.28.34.000000000 AM | (null) |
| 14 | 2801 | 103 NEW | 22-DEC-22 02.37.19.000000000 | 02-NOV-23 11.29.27.000000000 AM | (null) | 08-AUG-23 12.33.33.000000000 AM | (null) |
| 15 | 2802 | 103 NEW | 02-NOV-23 11.29.28.000000000 | 03-NOV-23 03.49.21.000000000 AM | (null) | 08-AUG-23 12.33.33.000000000 AM | (null) |
| 16 | 2803 | 103 NEW | 03-AUG-23 05.49.23.000000000 | 04-AUG-23 02.29.23.000000000 AM | (null) | 08-AUG-23 12.28.36.000000000 AM | (null) |
| 17 | 2804 | 103 NEW | 02-AUG-23 02.29.26.000000000 | 07-AUG-23 09.23.27.000000000 AM | (null) | 08-AUG-23 12.28.36.000000000 AM | (null) |
| 18 | 2805 | 103 NEW | 08-AUG-22 06.06.14.000000000 | 23-MAY-22 03.05.23.000000000 AM | (null) | 08-AUG-23 12.29.62.000000000 AM | (null) |
| 19 | 2807 | 103 NEW | 23-MAY-22 03.05.63.000000000 | 23-MAY-22 06.06.13.000000000 AM | (null) | 08-AUG-23 12.29.01.000000000 AM | (null) |
| 20 | 2806 | 103 NEW | 22-MAY-22 01.17.66.000000000 | 22-MAY-22 09.33.61.000000000 AM | (null) | 08-AUG-23 12.29.01.000000000 AM | (null) |
| 21 | 2785 | 103 JOB_INITIATED | 22-MAY-22 05.04.06.000000000 | 22-MAY-22 01.17.65.000000000 AM | (null) | 08-AUG-23 12.31.35.000000000 AM | 08-AUG-23 12.31.35.000000000 AM |
| 22 | 2809 | 103 NEW | 07-AUG-23 09.13.28.000000000 | 12-MAY-22 05.04.06.000000000 AM | (null) | 08-AUG-23 12.28.36.000000000 AM | (null) |
| 23 | 2783 | 103 JOB_INITIATED | 21-MAY-22 11.01.23.000000000 | 21-MAY-22 05.45.21.000000000 AM | (null) | 08-AUG-23 12.31.28.000000000 AM | 08-AUG-23 12.31.26.000000000 AM |
| 24 | 2782 | 103 JOB_INITIATED | 21-MAY-22 05.06.07.000000000 | 21-MAY-22 11.21.21.000000000 AM | (null) | 08-AUG-23 12.31.23.000000000 AM | 08-AUG-23 12.31.23.000000000 AM |

FIG. 5

METHOD AND SYSTEM FOR MIGRATING DATABASE CONTENT ONTO NEW DATABASE INFRASTRUCTURE

CROSS-REFERENCE TO RELATED APPLICATIONS

This is a continuation of U.S. patent application Ser. No. 18/440,269, filed Feb. 13, 2024, now U.S. Pat. No. 12,259, 858 which claims the benefit of priority of Indian Patent Application number 202311089523, filed Dec. 28, 2023. The entire contents of each of the above-mentioned documents is incorporated herein by reference.

BACKGROUND

1. Field of the Invention

The field of the invention disclosed herein generally relates to a database migration management tool and, more particularly, to a method, system, and computer-readable storage medium for implementing database migration technology that provides fine-grained management of one or more database migrations and also provides a dynamically customizable interface for such management, thereby improving the efficiency and accuracy of existing database migration technology.

2. Background of the Invention

In today's information age, organizations are facing many challenges in the timely and accurate migration of large volumes of data to new infrastructure, such as when migrating data from an on-premises database to a cloud-based database, for example. However, existing techniques and technology available for the migration of large databases, are rudimentary and provide little flexibility to such migrations. As a result, conventional database migration efforts are typically unnecessarily tedious.

Accordingly, large organizations inefficiently expend a vast amount of their resources on database migration. Furthermore, although there are relatively few engineers who might be able to utilize such amounts of resources to deliver a custom database migration solution to a large organization, there is currently no way to customize a framework that migrates data onto new infrastructure.

Therefore, there is a need in the field of the herein-disclosed invention for a technical solution to the foregoing limitation(s) in the technology of existing approaches for migrating a database's content onto new infrastructure.

SUMMARY

The present disclosure, through one or more of its various aspects, embodiments, and/or specific features or sub-component, provides, inter alia, various systems, servers, devices, methods, media, programs and platforms for implementing a database migration management tool that provides fine-grained management of one or more database migrations and provides a dynamically customizable interface for such management, thereby improving the efficiency and accuracy of existing database migration technology.

According to an aspect of the present disclosure, a method is provided for implementing a database migration management tool. The method may comprise: determining an optimal migration cache size; interfacing with a source database that includes a plurality of database record entries that comprises a plurality of respective database record entry sizes and a plurality of respective database record entry dates; indexing each respective entry from among the plurality of database record entries based on the plurality of respective database record entry dates; respectively prioritizing each entry from among the plurality of database record entries for migration based on the plurality of respective database record entry dates and the plurality of respective database record entry sizes; queuing, via a respective migration cache, unmigrated database record entries of at least one from among an initial queue and a next queue, for migration based on each respective prioritization; initiating a migration of each respective entry from among the unmigrated database record entries of the at least one from among the initial queue and the next queue; monitoring a respective progress of the migration of each respective entry from among the unmigrated database record entries of the at least one from among the initial queue and the next queue; and providing a status of the respective progress of the migration of each respective entry from among the plurality of database record entries.

In the method, the optimal migration cache size may comprise seventy percent of a maximum amount of physical space that is available for the respective migration cache.

In the method, the unmigrated database record entries of the at least one from among the initial queue and the next queue may comprise a set of unmigrated database record entries that fits within the optimal migration cache size and that has a highest aggregate priority from among a plurality of sets of unmigrated database record entries that fits within the optimal migration cache size.

In the method, the respectively prioritizing may comprise: prioritizing, based on the plurality of respective database record entry dates, from least recent to most recent, each database record entry that fits within the optimal migration cache size; and de-prioritizing, based on the plurality of respective database record entry sizes, from largest to smallest, each database record entry that does not fit within the optimal migration cache size.

In the method, the queuing may comprise storing, within the respective migration cache, contents of each respective entry from among the unmigrated database record entries of the at least one from among the initial queue and the next queue.

In the method, the monitoring may comprise one from among continuous monitoring and intermittent monitoring.

In the method, the providing may comprise interactively displaying, via a graphical user interface (GUI), the status of the respective progress of the migration of each respective entry from among the plurality of database record entries.

The method may further comprise: determining that at least one database record entry migration status indicates that an error has occurred; re-initiating, via the GUI, a migration of at least one database record entry that corresponds to the at least one database record entry migration status that comprises an error; obtaining at least one re-initiated progress of the migration of the at least one database record entry that corresponds to the at least one database record entry migration status; and indicating, via the GUI, the at least one re-initiated progress of the migration at least one database record entry.

The method may further comprise converting contents of the plurality of database record entries from a first schema to a second schema. The source database may utilize the first schema, and a target database of the migration may utilize the second schema.

The method may further comprise manually re-prioritizing, via a graphical user interface (GUI), at least one migration of at least one corresponding entry from among the plurality of database record entries.

According to another aspect of the present disclosure, a system is provided for implementing a database migration management tool. The system may comprise a processor and memory storing instructions that, when executed by the processor, cause the processor to perform operations. The operations may comprise: determining an optimal migration cache size; interfacing with a source database that includes a plurality of database record entries that comprises a plurality of respective database record entry sizes and a plurality of respective database record entry dates; indexing each respective entry from among the plurality of database record entries based on the plurality of respective database record entry dates; respectively prioritizing each entry from among the plurality of database record entries for migration based on the plurality of respective database record entry dates and the plurality of respective database record entry sizes; queuing, via a respective migration cache, unmigrated database record entries of at least one from among an initial queue and a next queue, for migration based on each respective prioritization; initiating a migration of each respective entry from among the unmigrated database record entries of the at least one from among the initial queue and the next queue; monitoring a respective progress of the migration of each respective entry from among the unmigrated database record entries of the at least one from among the initial queue and the next queue; and providing a status of the respective progress of the migration of each respective entry from among the plurality of database record entries.

In the system, when executed by the processor, the instructions may cause the optimal migration cache size to comprise seventy percent of a maximum amount of physical space that is available for the respective migration cache.

In the system, when executed by the processor, the instructions may cause the unmigrated database record entries of the at least one from among the initial queue and the next queue to comprise a set of unmigrated database record entries that fits within the optimal migration cache size and that has a highest aggregate priority from among a plurality of sets of unmigrated database record entries that fits within the optimal migration cache size.

In the system, when executed by the processor, the instructions may cause the respectively prioritizing to comprise: prioritizing, based on the plurality of respective database record entry dates, from least recent to most recent, each database record entry that fits within the optimal migration cache size; and de-prioritizing, based on the plurality of respective database record entry sizes, from largest to smallest, each database record entry that does not fit within the optimal migration cache size.

In the system, when executed by the processor, the instructions may cause the queuing to comprise: storing, within the respective migration cache, contents of each respective entry from among the unmigrated database record entries of the at least one from among the initial queue and the next queue.

In the system, when executed by the processor, the instructions may cause the monitoring to comprise one from among continuous monitoring and intermittent monitoring.

In the system, when executed by the processor, the instructions may cause the providing to comprise interactively displaying, via a graphical user interface (GUI), the status of the respective progress of the migration of each respective entry from among the plurality of database record entries.

In the system, the instructions cause the processor to perform further operations when executed, and the further operations may comprise: determining that at least one database record entry migration status indicates that an error has occurred; re-initiating, via the GUI, a migration of at least one database record entry that corresponds to the at least one database record entry migration status that comprises an error; obtaining at least one re-initiated progress of the migration of the at least one database record entry that corresponds to the at least one database record entry migration status; and indicating, via the GUI, the at least one re-initiated progress of the migration at least one database record entry.

In the system, the instructions may cause the processor to perform further operations when executed, and the further operations may comprise converting contents of the plurality of database record entries from a first schema to a second schema. The source database may utilize the first schema, and a target database of the migration may utilize the second schema.

In the system, the instructions cause the processor to perform further operations when executed, and the further operations may comprise manually re-prioritizing, via a graphical user interface (GUI), at least one migration of at least one corresponding entry from among the plurality of database record entries.

According to yet another aspect of the present disclosure, a non-transitory computer-readable medium is provided for implementing a database migration management tool. The computer-readable medium comprises instructions that may cause a processor to perform operations when executed by the processor. The operations may comprise: determining an optimal migration cache size; interfacing with a source database that includes a plurality of database record entries that comprises a plurality of respective database record entry sizes and a plurality of respective database record entry dates; indexing each respective entry from among the plurality of database record entries based on the plurality of respective database record entry dates; respectively prioritizing each entry from among the plurality of database record entries for migration based on the plurality of respective database record entry dates and the plurality of respective database record entry sizes; queuing, via a respective migration cache, unmigrated database record entries of at least one from among an initial queue and a next queue, for migration based on each respective prioritization; initiating a migration of each respective entry from among the unmigrated database record entries of the at least one from among the initial queue and the next queue; monitoring a respective progress of the migration of each respective entry from among the unmigrated database record entries of the at least one from among the initial queue and the next queue; and providing a status of the respective progress of the migration of each respective entry from among the plurality of database record entries.

In the computer-readable medium, when executed by the processor, the instructions may cause the optimal migration cache size to comprise seventy percent of a maximum amount of physical space that is available for the respective migration cache.

In the computer-readable medium, when executed by the processor, the instructions may cause the unmigrated database record entries of the at least one from among the initial queue and the next queue to comprise a set of unmigrated database record entries that fits within the optimal migration cache size and that has a highest aggregate priority from among a plurality of sets of unmigrated database record entries that fits within the optimal migration cache size.

In the computer-readable medium, when executed by the processor, the instructions may cause the respectively prioritizing to comprise: prioritizing, based on the plurality of respective database record entry dates, from least recent to most recent, each database record entry that fits within the optimal migration cache size; and de-prioritizing, based on the plurality of respective database record entry sizes, from largest to smallest, each database record entry that does not fit within the optimal migration cache size.

In the computer-readable medium, when executed by the processor, the instructions may cause the queuing to comprise storing, within the respective migration cache, contents of each respective entry from among the unmigrated database record entries of the at least one from among the initial queue and the next queue.

In the computer-readable medium, when executed by the processor, the instructions may cause the monitoring to comprise one from among continuous monitoring and intermittent monitoring.

In the computer-readable medium, when executed by the processor, the instructions may cause the providing to comprise interactively displaying, via a graphical user interface (GUI), the status of the respective progress of the migration of each respective entry from among the plurality of database record entries.

In the computer-readable medium, when executed, the instructions may cause the processor to perform further operations that comprise: determining that at least one database record entry migration status indicates that an error has occurred; re-initiating, via the GUI, a migration of at least one database record entry that corresponds to the at least one database record entry migration status that comprises an error; obtaining at least one re-initiated progress of the migration of the at least one database record entry that corresponds to the at least one database record entry migration status; and indicating, via the GUI, the at least one re-initiated progress of the migration at least one database record entry.

In the computer-readable medium, when executed, the instructions may cause the processor to perform further operations that comprise converting contents of the plurality of database record entries from a first schema to a second schema. The source database may utilize the first schema, and a target database of the migration may utilize the second schema.

The computer-readable medium, when executed, the instructions may cause the processor to perform further operations that comprise manually re-prioritizing, via a graphical user interface (GUI), at least one migration of at least one corresponding entry from among the plurality of database record entries.

Thereby, the invention disclosed herein improves the efficiency and accuracy of existing database migration technology by providing fine-grained management of one or more database migrations and by providing a dynamically customizable interface for the management of such migrations.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for migrating a database's content onto a new database's infrastructure.

FIG. 5 illustrates an exemplary interface for migrating a plurality of database records.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
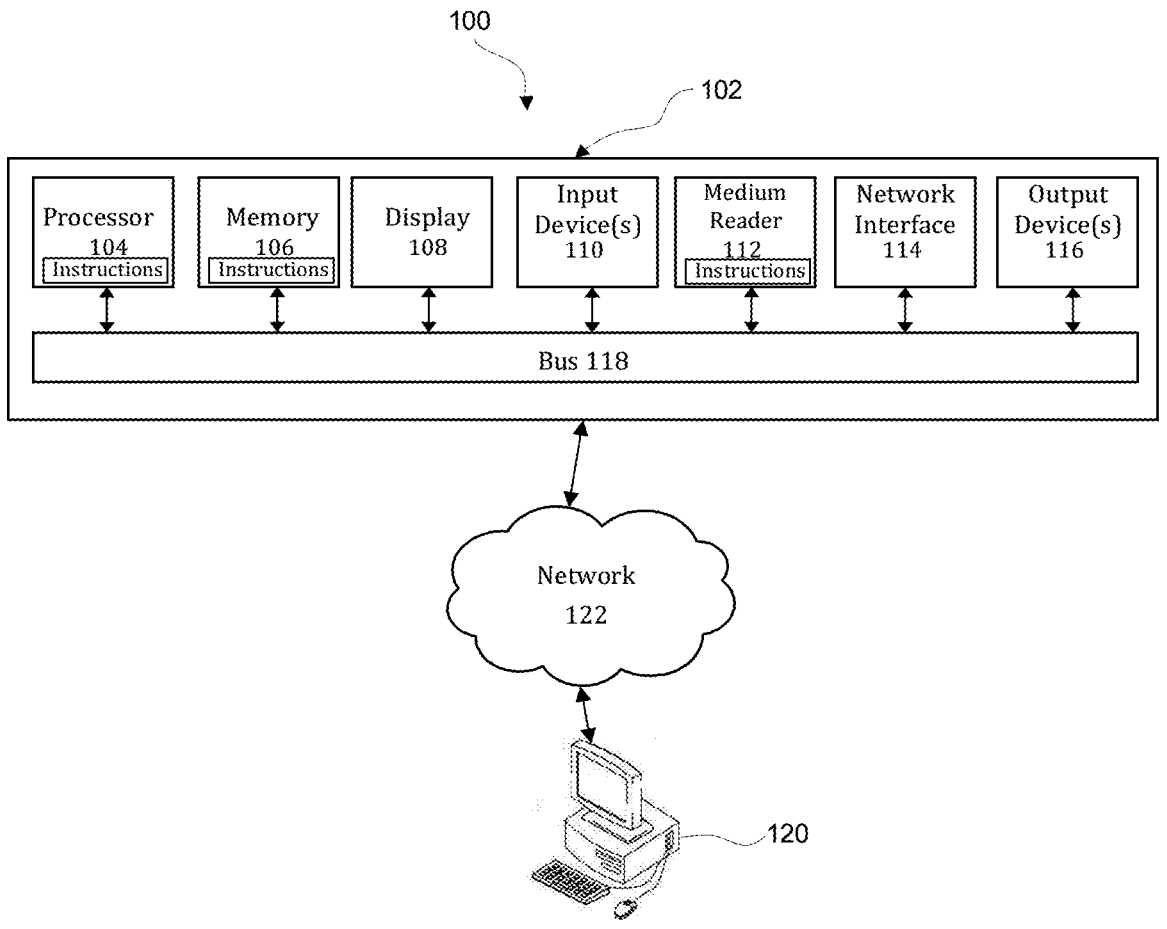
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a database migration management tool that provides fine-grained management of one or more database migrations and provides a dynamically customizable interface for such management.

Figure 2:
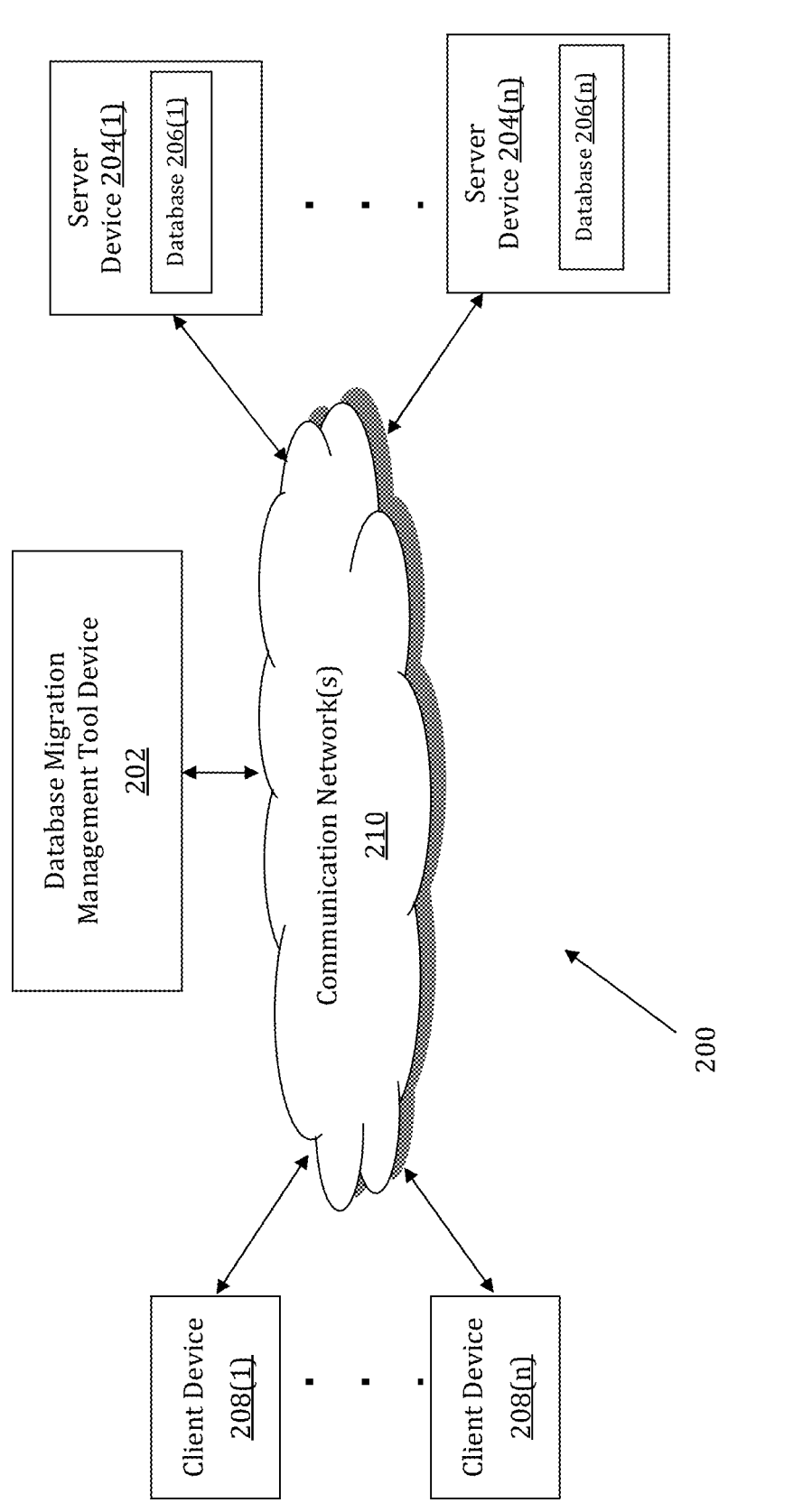
FIG. 2 is a diagram of an exemplary network environment for migrating a database's content onto a new database's infrastructure.

Referring to FIG. 2, a schematic of an exemplary network environment 200 for migrating a database's content onto a new database's infrastructure and, thereby, improving the efficiency and accuracy of existing database migration technology. In an exemplary embodiment, a database migration tool may be implemented on any networked computer platform, such as, for example, a personal computer (PC).

A method for migrating a database's content onto a new database's infrastructure may be implemented by a Database Migration Management Tool (DMMT) device 202. The DMMT device 202 may be the same or similar to the computer system 102 as described with respect to FIG. 1. The DMMT device 202 may be a rack-mounted server in a datacenter, an embedded microcontroller (MCU) in an electronic device, or another type of headless system, which is a computer system or device that is configured to operate without a monitor, keyboard and mouse. The DMMT device 202 may store one or more applications that can include executable instructions that, when executed by the DMMT device 202, cause the DMMT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DMMT device 202 itself, may be located in virtual server(s) running in a cloud-based computing environment rather than being tied to one or more specific physical network computing devices. Also, the application(s) may be running in one or more virtual machines (VMs) executing on the DMMT device 202. Additionally, in one or more embodiments of this technology, virtual machine(s) running on the DMMT device 202 may be managed or supervised by a hypervisor.

In the network environment 200 of FIG. 2, the DMMT device 202 is coupled to a plurality of server devices 204(1)-204(n) that hosts a plurality of databases 206(1)-206(n), and also to a plurality of client devices 208(1)-208(n) via communication network(s) 210. A communication interface of the DMMT device 202, such as the network interface 114 of the computer system 102 of FIG. 1, operatively couples and communicates between the DMMT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DMMT device 202, the server devices 204(1)-204 (n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and DMMT devices that implement a method for a database migration management tool that improves the efficiency and accuracy of existing database migration technology.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DMMT device 202 may be a standalone device or integrated with one or more other devices or apparatuses, such as one or more of the server devices 204(1)-204(n), for example. In one particular example, the DMMT device 202 may include or be hosted by one of the server devices 204(1)-204(n), and other arrangements are also possible. As another example, the DMMT device 202 may be integrated with one or more other devices or apparatuses, such as one or more of the client devices 208(1)-208(n). Moreover, one or more of the devices of the DMMT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DMMT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DMMT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DMMT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DMMT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DMMT device 202, the server devices 204(1)-204(n), the databases 206(1)-206(n), or the client devices 208(1)-208(n), for example, may be configured to operate as virtual instances on the same physical machine. In other words, one or more of the DMMT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
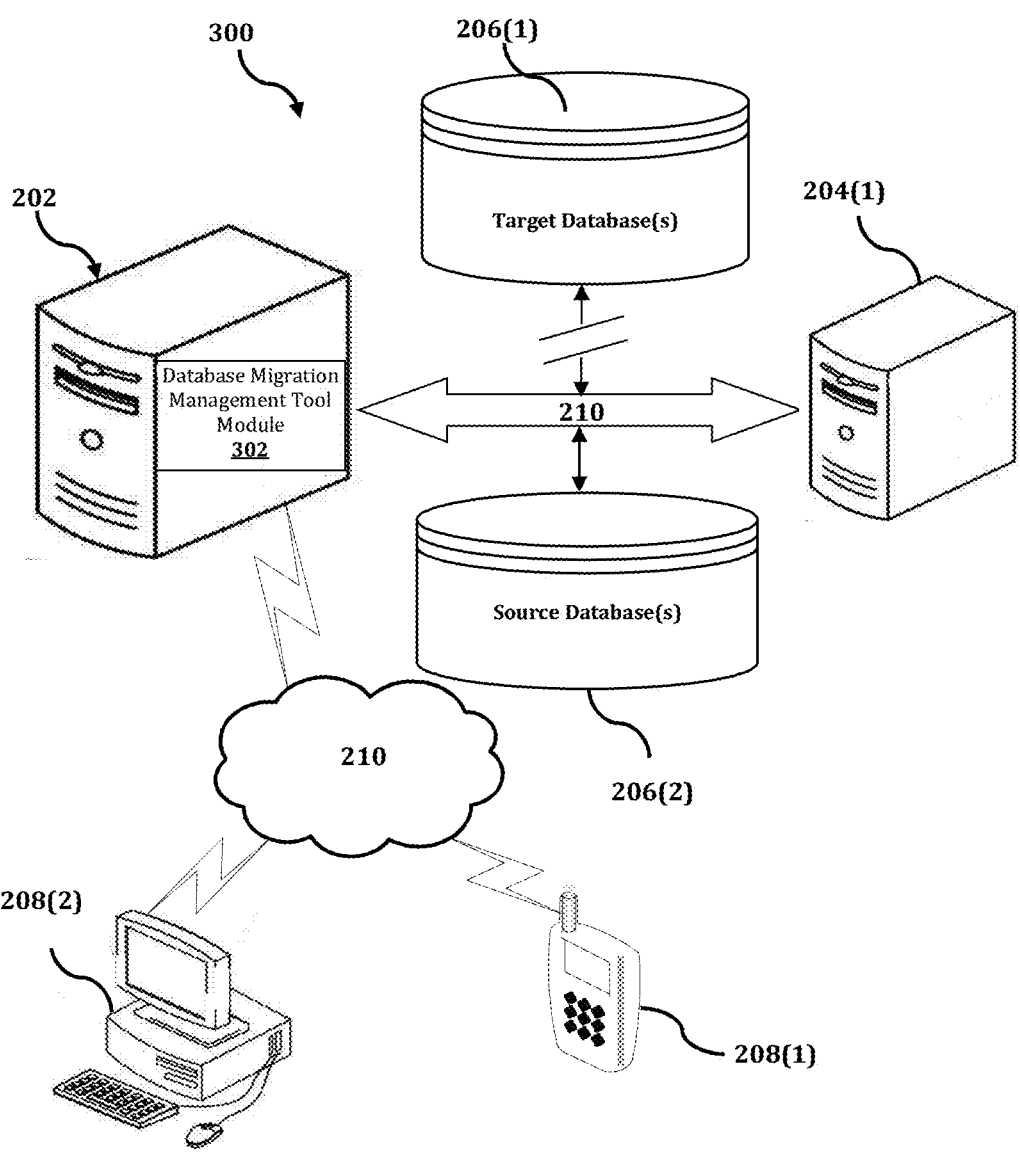
FIG. 3 is a diagram of an exemplary perspective of a network environment for migrating a database's content onto a new database's infrastructure.

The DMMT device 202 is described and illustrated in FIG. 3 as including database migration management tool module 302, although it may include other rules, policies, modules, databases, or applications, for example. As will be described below, database migration management tool module 302 is configured to provide a dynamically customizable interface for fine-grained management of one or more database migrations and thereby improve the efficiency and accuracy of such migrations. Database migration management tool module 302 may include software that is based on a microservices architecture.

Database migration management tool module 302 may be integrated with one or more devices or apparatuses, such as client devices 208(1)-208(n), where database migration management tool module 302 may be implemented as an application or as an addon or plugin to another application of the one or more devices or apparatuses, and where database migration management tool module 302 may execute in the background.

An exemplary process 300 for application of a database migration management tool to an aspect of the network environment of FIG. 2 is illustrated as being executed in FIG. 3. Specifically, a first client device 208(1) and a second client device 208(2) are illustrated as being in communication with DMMT device 202. In this regard, the first client device 208(1) and the second client device 208(2) may be "clients" of the DMMT device 202 and are described herein as such. Nevertheless, it is to be known and understood that the first client device 208(1) and/or the second client device 208(2) need not necessarily be "clients" of the DMMT device 202, or any entity described in association therewith herein. Any additional or alternative relationship may exist between either or both of first client device 208(1), second client device 208(2) and DMMT device 202, or no relationship may exist.

Further, DMMT device 202 is illustrated as being able to access target database(s) 206(1), and source database(s) 206(2). DMMT device 202 may comprise database migration management tool module 302, which communicates with target database(s) 206(1). In addition, database migration management tool module 302 of DMMT device 202 may also communicate with source database(s) 206(2). Database migration management tool module 302 may be configured to provide a dynamically customizable interface for fine-grained management of one or more database migrations and thereby improve the efficiency and accuracy of such migrations.

Moreover, DMMT device 202 may receive and transmit data via communication network(s) 210. DMMT device 202 may receive and transmit data such as code that is written in one or more of the following dialects: transaction control language (TCL), data manipulation language (DML), data control language (DCL) and data definition language (DFL). Additionally, via communication network(s) 210, DMMT device 202 may respectively receive and transmit data from and to one or more from among the following devices: server device 204, target database(s) 206(1), source database(s) 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the DMMT device 202 via broadband or cellular communication. Of course, these embodiments are merely exemplary and are not limiting or exhaustive.

Database migration management tool module 302 may transfer substantial amounts of data from on-premises databases to cloud-based databases in a swift and accurate manner. Additionally, database migration management tool module 302 provides a highly adaptable data migration framework that effortlessly moves data (and corresponding database details) from on-premises systems to a public cloud with minimal configuration. In an embodiment, the most common database options may be set as default configurations.

Database migration management tool module 302 may not only automate data extraction and loading, but database migration management tool module 302 may also intelligently determine the optimal data chunk size for migration. Furthermore, database migration management tool module 302 simplifies the migration process and ensures both speed and data precision.

Although database migration management tool module 302 may be preprogrammed with generic default data migration settings, database migration management tool module 302 also provides the flexibility of settings that may be individually customized according to their specific requirements. Database migration management tool module 302 simplifies and accelerates the migration process to save valuable time and resources while ensuring seamless transitions to cloud-based data storage.

Database migration management tool module 302 may define tables with source and destination schema through a customizable configuration system. Database migration management tool module 302 may also execute full load operations and support multiple migration cycles as well as target table truncation. Database migration management tool module 302 may efficiently extract data from on-premises database in manageable chunks to minimize the impact on the source database.

Database migration management tool module 302 may load data into cloud-based databases by utilizing optimized techniques for high-speed migration. Moreover, database migration management tool module 302 may also incorporate robust error-handling, logging, and monitoring mechanisms for a flawless migration experience.

Database migration management tool module 302 may execute a process that provides fine-grained management of one or more database migrations and provides a dynamically customizable interface for such management, thereby improving the efficiency and accuracy of existing database migration technology. An exemplary process for a database migration management tool is generally indicated at flowchart 400 in FIG. 4.

In process 400 of FIG. 4, at step S402, database migration management tool module 302 determines an optimal migration cache size. In an embodiment, the optimal migration cache size may comprise seventy percent (70%) of a maximum amount of physical space that is available for a respective migration cache. However, the optimal migration cache size may additionally or alternatively comprise other values as well.

At step S404, database migration management tool module 302 interfaces with a source database that includes a plurality of database record entries that comprises a plurality of respective database record entry sizes and a plurality of respective database record entry dates, such as a relational database and/or a very large database (VLDB), for example. However, the source database may comprise additional or alternative types of databases as well.

At step S406, database migration management tool module 302 indexes each respective entry from among the plurality of database record entries based on the plurality of respective database record entry dates. Accordingly, the plurality of database record entries may be arranged in order based on their respective record entry date, and database migration management tool module 302 may utilize the respective database record entry dates as a key to identify, locate and/or otherwise manage each respective entry from among the plurality of database record entries.

At step S408, database migration management tool module 302 respectively prioritizes each entry from among the plurality of database record entries for migration based on both the plurality of respective database record entry dates and the plurality of respective database record entry sizes. In an embodiment, the respective prioritization of each of these entries may comprise prioritizing each database record entry that fits within the optimal migration cache size, from least recent to most recent database record entry date based on the plurality of respective database record entry dates.

In an embodiment, the respective prioritization of each of these entries may additionally or alternatively comprise de-prioritizing each database record entry that does not fall within the optimal migration cache size, from largest to smallest database record size based on the plurality of respective database record entry sizes. In such an embodiment, larger records that exceed the optimal chuck size may be migrated after smaller records are migrated. However, such larger records may additionally or alternatively be re-prioritized based on a relative urgency of their migration.

Similarly, in an embodiment, at least one migration of at least one corresponding entry from among the plurality of database record entries may be re-prioritized. In the embodiment, the plurality of database record entries may re-prioritized manually and/or based on at least one service level agreement and/or another factor that renders their migration urgent. In a further embodiment, database migration management tool module 302 may utilize an interface (e.g., a GUI) to re-prioritize the at least one corresponding entry from among the plurality of database record entries.

In an embodiment, at step S408, database migration management tool module 302 may also determine whether one more record may be added to database record entries that aggregately fit within the optimal migration cache size. In an embodiment, such a determination may comprise evaluating whether an absolute difference between the optimal migration cache size and an aggregate size of the database record entries that aggregately fit within the optimal migration cache size, is less than an absolute difference between the optimal migration cache size and a total size of the aggregated database record entries plus a size of one more record entry.

Thereby, at step S408, when the aggregate size of the database record entries that aggregately fit within the optimal migration cache size is less than the absolute difference between the optimal migration cache size and the total size of the aggregated database record entries further aggregated to the size of the one more record entry, then database migration management tool module 302 may determine that the one more record should not be added to database record entries that aggregately fit within the optimal migration cache size, and vice versa.

At step S410, database migration management tool module 302 prepares a next queue of unmigrated database records for migration. In an embodiment, database migration management tool module 302 may prepare the at least one from among the initial queue and the next queue for migration by queuing a set of unmigrated database record entries for migration via a corresponding migration cache based on a set of prioritizations that respectively correspond to the set of unmigrated database record entries.

In the embodiment, the queuing may comprise storing contents of each respective entry from among the unmigrated database record entries of the at least one from among the initial queue and the next queue, and the contents of each of these entries may be stored collectively within a cache for the at least one from among the initial queue and the next queue's migration. Moreover, in the embodiment, the initial queue may be the next queue of database record entries that have been queued for migration.

In the embodiment, the unmigrated database record entries of the at least one from among the initial queue and the next queue may additionally or alternatively comprise a set of unmigrated database record entries that collectively fits within the optimal migration cache size (but may further comprise one more record entry, as mentioned above), and the unmigrated database record entries of the at least one from among the initial queue and the next queue may also additionally or alternatively comprise a higher aggregate priority than any other set of unmigrated database record entries that fits within the optimal migration cache size.

At step S412, database migration management tool module 302 initiates a migration of each respective entry from among the unmigrated database record entries of the at least one from among the initial queue and the next queue. In an embodiment, the migration of each respective entry may be performed in parallel for a faster migration. However, in an alternative embodiment, the migration of each respective entry may instead be performed asynchronously, and based on their respective prioritizations, to conserve resources. Furthermore, in yet another embodiment, these migrations may be comprised of both a parallel and asynchronous migration of entries from among the unmigrated database record entries of the at least one from among the initial queue and the next queue.

At step S414, database migration management tool module 302 monitors a respective progress of the migration of each respective entry from among the unmigrated database record entries of the at least one from among the initial queue and the next queue. In an embodiment, database migration management tool module 302 may perform step S414 either continuously or intermittently. In such an embodiment, intermittently monitoring may comprise monitoring any pending migrations: at predetermined intervals (e.g., every 1, 5, or 10 seconds, minutes, hours, days, weeks, etc.); and/or when database migration management tool module 302 determines that a pending migration has made some progress (e.g., 0.1%, 0.5%, 1%, 5% or 10% change in progress towards completion).

At step S416, database migration management tool module 302 may provide a status of the respective progress of the migration of each respective entry from among the plurality of database record entries. In an embodiment, database migration management tool module 302 may provide the respective migration progress status of each entry by interactively displaying the status of each respective progress of the plurality of database record entries' respective migrations.

After step S416, database migration management tool module 302 may determine that at least one database record entry migration status indicates that an error has occurred and, in response to this determination, database migration management tool module 302 may re-initiate a migration of only at least one database record entry that corresponds to the at least one database record entry migration status that comprises an error. In an embodiment, after step S416, a user may utilize database migration management tool module 302 to intervene as needed, e.g., such as by manually triggering one or more re-initiations of at least one such migration.

In addition, after step S416, database migration management tool module 302 may also continuously or intermittently obtain at least one re-initiated progress of the migration of the at least one database record entry that corresponds to the at least one database record entry migration status that comprises an error, and database migration management tool module 302 may provide an indication of a progress of each of the at least one respective re-initiated migration of the at least one corresponding database record entry.

In addition to the foregoing, process 400 may comprise configuring database migration management tool module 302 to convert contents of the plurality of database record entries from a first schema to a second schema. In this embodiment, the source database may utilize the first schema, and a target database of the migration may utilize the second schema. Additionally or alternatively, the source schema and target schema are usually the same, however configuring database migration management tool module 302 has a differentiating factor. In an exemplary embodiment, the differentiating factor may be that users are permitted to select a target schema that is not similar to a corresponding source schema.

In an embodiment, database migration management tool module 302 may provide one or more indications of progress via an interface and, in a further embodiment, the interface may comprise a graphical user interface (GUI). In yet a further embodiment, an interface (such as a GUI) may be utilized by a user, administrator or some other entity (e.g., a software module) to perform each function mentioned above via database migration management tool module 302.

Additionally, in an embodiment, database migration management tool module 302 may utilize an algorithm to determine an optimal data chunk size (e.g., an optimal migration cache size). The algorithm for determining the optimal data chunk size may comprise: defining initial sizing parameters; adjusting chunk size based on parameters; and deriving an optimal chunk size (such as an optimal migration cache size, for example) based on the least chunk value from among a maximum number of records per chunk, a physical data size; and a sampling.

In an embodiment, the initial sizing parameters may be based on a maximum chunk size and/or a sample volume. In the embodiment, the chunk size may be adjusted based on a runtime, a maximum amount of memory that is available to an application, and a maximum size for each chunk, e.g., seventy percent (70%) of a maximum amount of memory that is available to such an application, which may be based on a physical volume that is occupied.

For example, in an embodiment, the maximum amount of memory that is available to such an application may be based on: a maximum number of records per chunk; a physical data size, e.g., by checking a total physical volume occupied by tables in a database and deriving the chunk size based on a default maximum data size; and an optional sampling that creates a sample file to derive an actual file size.

In an embodiment, a database's table size may be identified from a metadata table based on column size. In the embodiment the database's table size may be identified via commands equivalent to the pseudocode set forth in Table 1 below, for example.

TABLE 1

```
SELECT AVG(ROW_SIZE)/1024 AS avg_row_size_kb
    From (select sum(case
        when data_type='NUMBER' THEN (data_precision + 2)/2
        ELSE data_length  END
    ) AS ROW_SIZE
    FROM ALL_TAB_COLUMNS
```

TABLE 1-continued

```
WHERE TABLE NAME='table name'
GROUP BY TABLE_NAME )
```

An exemplary embodiment may comprise an 'avg_row_size_kb' of 10 KB, a total number of records of 1 MB, and a chunk size of approximately 200K. In this exemplary embodiment may be based on a 'max_data_size' of 2 GB and/divided by an 'avg_row_size_kb' of 10 KB). In another embodiment, a database's table size may be identified based on a physical volume consumed in datafiles and/or segments.

The latter embodiment may comprise a segment_name of 'table_name', a table physical data size of 40 GB (by querying an entire table's data), a "max_data_size of 2 GB per file created, a total number of one million records in the table, and a total number of 20 chunks (based on a table physical data size of 40 GB and/divided by a max_data_size of 2 GB per file). Accordingly, such embodiment may have a chunk size of 50 KB (based on a total number of records of 1 M records and/divided by a total number of 20 chunks).

In another exemplary embodiment, sampling may optionally be utilized to create a sample file in order to derive an actual size of the file. This exemplary embodiment may comprise a sample size of 100, a sample file size of 10 MB, a total number of 50K records, a derived file size of approximately 5 GB (which may be based on: (1) a sample file size of 10 MB, (2) divided by a sample size of 100, and (3) multiplied by 50K).

Accordingly, after an optimal chunk size (such as an optimal migration cache size, for example) is derived, database migration management tool module 302 can notify entities of details including a total records count, a file name, a chuck size and range. After a file is created then subsequently migrated to a destination, a notification of final details may be forwarded to an entity for verification. In an exemplary embodiment, such notifications may be generated from a log table.

An exemplary configuration processing status is provided in Table 2 below, which is an exemplary table that may be utilized to configure database tables that need to be migrated.

TABLE 2

| Status | Comment |
| --- | --- |
| NEW | Ready to populate chunks |
| MIG_CHUNKS_POPULATED | Chunks populated to tracker table |
| COMPLETED | Data Migrated to target database's table(s) |
| FAILED | Failed to populate chunks |

An exemplary chunks tracker status is provided in Table 3 below, which is an exemplary table that may be utilized to store data chunks for their data's migration.

TABLE 3

| Status | Comment |
| --- | --- |
| NEW | Ready to process chunks |
| JOB_INITIATED | Initiation of job to read data chunk from source database |
| MIG_CHUNKS_POPULATED | File created with data chunk and uploaded to target database |
| POSTGRES_INITIATED | Initiated target database to Postgres Data Import |
| COMPLETED | Data chunk inserted to Postgres |
| FAILED | Failure in Data Import |

FIG. 5 depicts an exemplary interface 500 that may be utilized to migrate a plurality of database records. In an exemplary embodiment, interface 500 may be utilized to provide a status of a respective progress of a migration of respective database record entries and/or of a re-initiation of such migration.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing a database migration management tool, the method comprising:
   determining an optimal migration cache size;
   interfacing with a source database that includes a plurality of database record entries that comprises a plurality of respective database record entry sizes and a plurality of respective database record entry dates;

indexing each respective entry from among the plurality of database record entries based on the plurality of respective database record entry dates;

respectively prioritizing each entry from among the plurality of database record entries for migration based on the plurality of respective database record entry dates and the plurality of respective database record entry sizes;

queuing, via a respective migration cache, unmigrated database record entries of at least one from among an initial queue and a next queue, for migration based on each respective prioritization; and initiating a migration of each respective entry from among the unmigrated database record entries of the at least one from among the initial queue and the next queue.

2. The method of claim 1, wherein the optimal migration cache size comprises seventy percent of a maximum amount of physical space that is available for the respective migration cache.

3. The method of claim 1, wherein the unmigrated database record entries of the at least one from among the initial queue and the next queue comprises a set of unmigrated database record entries that fits within the optimal migration cache size and that has a highest aggregate priority from among a plurality of sets of unmigrated database record entries that fits within the optimal migration cache size.

4. The method of claim 1, wherein the respectively prioritizing comprises:

prioritizing, based on the plurality of respective database record entry dates, from least recent to most recent, each database record entry that fits within the optimal migration cache size; and de-prioritizing, based on the plurality of respective database record entry sizes, from largest to smallest, each database record entry that does not fit within the optimal migration cache size.

5. The method of claim 1, wherein the queuing comprises:

storing, within the respective migration cache, contents of each respective entry from among the unmigrated database record entries of the at least one from among the initial queue and the next queue.

6. The method of claim 1, further comprising:

monitoring a respective progress of the migration of each respective entry from among the unmigrated database record entries of the at least one from among the initial queue and the next queue; and providing a status of the respective progress of the migration of each respective entry from among the plurality of database record entries.

7. The method of claim 6, wherein the providing comprises:

interactively displaying, via a graphical user interface (GUI), the status of the respective progress of the migration of each respective entry from among the plurality of database record entries.

8. The method of claim 7, further comprising:

determining that at least one database record entry migration status indicates that an error has occurred;

re-initiating, via the GUI, a migration of at least one database record entry that corresponds to the at least one database record entry migration status that comprises an error;

obtaining at least one re-initiated progress of the migration of the at least one database record entry that corresponds to the at least one database record entry migration status; and indicating, via the GUI, the at least one re-initiated progress of the migration at least one database record entry.

9. The method of claim 1, further comprising:

converting contents of the plurality of database record entries from a first schema to a second schema, wherein the source database utilizes the first schema and wherein a target database of the migration utilizes the second schema.

10. The method of claim 1, further comprising:

manually re-prioritizing, via a graphical user interface (GUI), at least one migration of at least one corresponding entry from among the plurality of database record entries.

11. A system for implementing a database migration management tool, the system comprising:

a processor; and memory storing instructions that, when executed by the processor, cause the processor to perform operations that comprise:

determining an optimal migration cache size;

interfacing with a source database that includes a plurality of database record entries that comprises a plurality of respective database record entry sizes and a plurality of respective database record entry dates;

indexing each respective entry from among the plurality of database record entries based on the plurality of respective database record entry dates;

respectively prioritizing each entry from among the plurality of database record entries for migration based on the plurality of respective database record entry dates and the plurality of respective database record entry sizes;

queuing, via a respective migration cache, unmigrated database record entries of at least one from among an initial queue and a next queue, for migration based on each respective prioritization; and initiating a migration of each respective entry from among the unmigrated database record entries of the at least one from among the initial queue and the next queue.

12. The system of claim 11, wherein when executed by the processor, the instructions cause the unmigrated database record entries of the at least one from among the initial queue and the next queue to comprise a set of unmigrated database record entries that fits within the optimal migration cache size and that has a highest aggregate priority from among a plurality of sets of unmigrated database record entries that fits within the optimal migration cache size.

13. The system of claim 11, wherein when executed by the processor, the instructions cause the respectively prioritizing to comprise:

prioritizing, based on the plurality of respective database record entry dates, from least recent to most recent, each database record entry that fits within the optimal migration cache size; and de-prioritizing, based on the plurality of respective database record entry sizes, from largest to smallest, each database record entry that does not fit within the optimal migration cache size.

14. The system of claim 11, wherein when executed, the instructions cause the processor to perform further operations that comprise:

monitoring a respective progress of the migration of each respective entry from among the unmigrated database record entries of the at least one from among the initial queue and the next queue; and providing a status of the respective progress of the migration of each respective entry from among the plurality of database record entries.

15. The system of claim 14, wherein when executed by the processor, the instructions cause the providing to comprise:

interactively displaying, via a graphical user interface (GUI), the status of the respective progress of the migration of each respective entry from among the plurality of database record entries.

16. The system of claim 15, wherein when executed, the instructions cause the processor to perform further operations that comprise:

determining that at least one database record entry migration status indicates that an error has occurred;

re-initiating, via the GUI, a migration of at least one database record entry that corresponds to the at least one database record entry migration status that comprises an error;

obtaining at least one re-initiated progress of the migration of the at least one database record entry that corresponds to the at least one database record entry migration status; and indicating, via the GUI, the at least one re-initiated progress of the migration at least one database record entry.

17. A non-transitory computer-readable medium for implementing a database migration management tool, the computer-readable medium comprising instructions that, when executed by a processor, cause the processor to perform operations that comprise:

determining an optimal migration cache size;

interfacing with a source database that includes a plurality of database record entries that comprises a plurality of respective database record entry sizes and a plurality of respective database record entry dates;

indexing each respective entry from among the plurality of database record entries based on the plurality of respective database record entry dates;

respectively prioritizing each entry from among the plurality of database record entries for migration based on the plurality of respective database record entry dates and the plurality of respective database record entry sizes;

queuing, via a respective migration cache, unmigrated database record entries of at least one from among an initial queue and a next queue, for migration based on each respective prioritization; and initiating a migration of each respective entry from among the unmigrated database record entries of the at least one from among the initial queue and the next queue.

18. The computer-readable medium of claim 17, wherein when executed by the processor, the instructions cause the optimal migration cache size to comprise seventy percent of a maximum amount of physical space that is available for the respective migration cache.

19. The computer-readable medium of claim 17, wherein when executed by the processor, the instructions cause the processor to perform further operations that comprise:

monitoring a respective progress of the migration of each respective entry from among the unmigrated database record entries of the at least one from among the initial queue and the next queue; and providing a status of the respective progress of the migration of each respective entry from among the plurality of database record entries.

20. The computer-readable medium of claim 17, wherein when executed, the instructions cause the processor to perform further operations that comprise:

converting contents of the plurality of database record entries from a first schema to a second schema, wherein the source database utilizes the first schema and wherein a target database of the migration utilizes the second schema.

* * * * *